United States Patent [19]

Tsuyoshi et al.

[11] Patent Number: 4,748,611
[45] Date of Patent: May 31, 1988

[54] INFORMATION RECORDING MEDIUM AND METHOD FOR REPRODUCING THE SAME

[75] Inventors: Toshiaki Tsuyoshi, Kokubunji; Masatoshi Otake, Ome; Sachio Kumagai, Hachioji; Kazuo Ichino, Nishitama; Wasao Takasugi, Higashiyamato; Seiji Yonezawa, Hachioji, all, Japan

[73] Assignee: Hitachi, Ltd., Tokyo, Japan

[21] Appl. No.: 857,088

[22] Filed: Apr. 29, 1986

[30] Foreign Application Priority Data

May 2, 1985 [JP] Japan .................................. 60-93618

[51] Int. Cl.$^4$ ............................ H04N 5/76; G11B 5/09
[52] U.S. Cl. ............................................. 369/59; 360/48
[58] Field of Search ....................... 369/59; 360/48, 51

[56] References Cited

U.S. PATENT DOCUMENTS

| | | | |
|---|---|---|---|
| 3,185,972 | 5/1965 | Sippel | 360/48 |
| 4,148,080 | 4/1979 | Rayle et al. | 360/51 |
| 4,675,749 | 6/1987 | Banno et al. | 369/59 |

Primary Examiner—Vincent P. Canney
Attorney, Agent, or Firm—Antonelli, Terry & Wands

[57] ABSTRACT

In an optical disk, one turn of a recording track is divided into a number of sectors. Each of these sectors is composed of a servo field, which is stored in advance with servo information for tracking, and a data recording area which is to be written with data. A predetermined number of these sectors are joined together to form a plurality of blocks. Each of these blocks is recorded at the data recording areas of its predetermined sectors with identification information for identifying the blocks and phase synchronization loop pull-in information for read out clocks.

2 Claims, 5 Drawing Sheets

INFORMATION RECORDING MEDIUM AND METHOD FOR REPRODUCING THE SAME

BACKGROUND OF THE INVENTION

The present invention relates to an information recording medium and a method for reproducing the same, and, more particularly, to an information recording medium suitable for use in an optical disk file of the sector servo type and a method for reproducing the read out clock of the same.

In an optical disk file system, for a user to record information, there has been adopted a method by which a pre-groove is formed in advance in a disk so that data pits may be recorded in said pre-groove while tracking with reference to the pre-groove. An example of such a pre-groove type optical disk file system is disclosed in detail in Nikkei Electronics (pp. 189 to 213), on Nov. 21, 1983.

In recent years, on the contrary, there has been proposed a sector servo type optical disk file system. According to this file system, one track on the disk is divided into small fields called "sectors", each of which is formed at its leading end with a servo field for generating control information such as tracking information so that a data recording area formed at the trailing end of the servo field may be recorded with data by controlling the tracking servo on the basis of the tracking information obtained from the servo field. Therefore, the sector servo type optical disk does not use any pre-groove, but obtains the tracking information only at the leading end of each sector so that the tracking control is a sampling type of control. In the pre-groove type, on the contrary, the tracking information is always obtained from the pre-grooves arranged continuously so that the tracking control is a continuous type of control. The sector servo type optical disk file system is disclosed in, for example, "Sector Servo Optical Disk File System," preprints of 45th Seminar of Japanese Association of Applied Physics (in October, 1984), pp. 56, 13p-E-8 and 13p-E-9. Incidentally, the sector servo type, has been proposed long before in the field of the magnetic disk, as in U.S. Pat. No. 3,185,972.

The sector servo type optical disk file system is preferred over the pre-groove type in that the tracking is more stable even with an optical pickup of simple construction.

On the other hand, the sector servo type requires a system which is different from that of the pre-groove type for writing and reading the data. In the sector servo type optical disk, the number of sectors for one complete loop of the disk (hereinafter referred to as a track) has a close relation to the tracking control and needs to be about 500~1000 sectors/track. It is, however, generally 100 sectors/track or less for the sector servo type magnetic disk. This value results from the fact that the optical disk has a tracking pitch of about 1.6 $\mu$m whereas the magnetic disk has a tracking pitch of 50 to 100 $\mu$m so that the latter disk has an easier tracking control. In the pre-groove type disk of the prior art, one track of the disk is divided into 100 sectors/track or less, and this sector number has no significant meaning in the tracking control, but is determined merely by a factor of the magnitude of the data processing unit.

Figure 1:
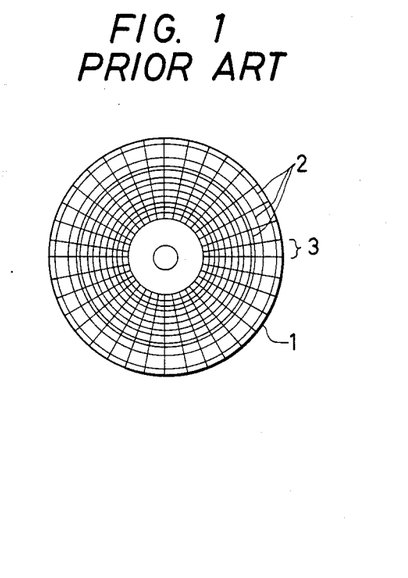
FIG. 1 is a diagram for explaining the structure of the optical disk.

FIG. 1 is a schematic view showing the shape of an optical disk 1, in which tracks 2 are arranged at a pitch of about 1.6 $\mu$m and each is divided into a plurality of sectors 3. The sector number of one track is 100 or less, as mentioned above, in the pre-groove type of the prior art and about 500 to 1,000 in the sector servo type.

Figure 2:
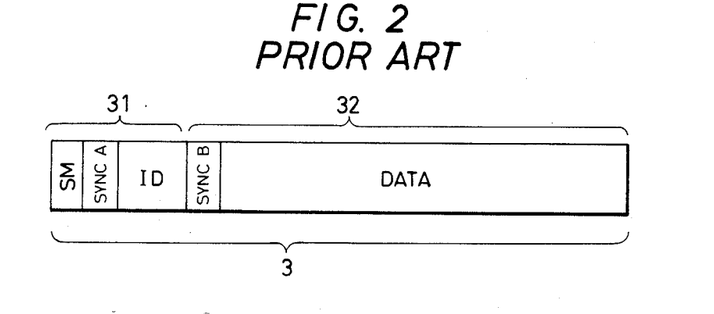
FIG. 2 is a diagram for explaining the structure of the sector of the pre-groove type optical disk.
Figure 3A:
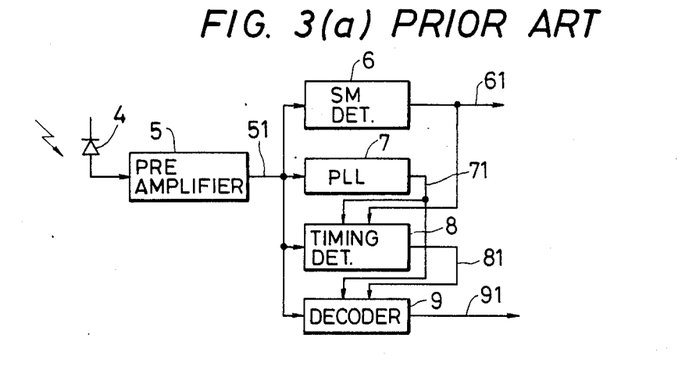
FIGS. 3(a) and 3(b) are diagrams for explaining the structure of a read out signal processing circuit.

FIG. 2 schematically shows the structure of one sector in the pre-groove type optical disk. If an optical disk having a diameter of 30 cm has a sector number of 64 sectors/track, for example, the length of each sector 3 corresponds to 690 bytes. Each sector 3 is divided into a pre-formatted area 31, which has been recorded in advance when the disk is fabricated, and a data recording area 32 for the user to record the data. The former pre-formatted area 31 is composed of: a sector mark SM for indicating the leading end of each sector; an identification signal (which will be shortly referred to as "ID") for indicating a track address and a sector address; and a synchronization signal SYNC A used for synchronizing a read out clock for reading out the ID. The method for reading out the ID information and data written in the sectors thus formatted according to the prior art will be described with reference to FIG. 3. FIG. 3(a) is a block diagram showing a signal read out system, in which the information on the disk is photoelectrically converted into an electric signal by an optical beam incident upon a photo detector 4 in the optical head of the optical disk system to generate a signal 51 amplified by a pre-amplifier 5. For simplicity, the signal 51 in FIG. 3 is digitized by a suitable processing. Here, it is assumed that a focusing control and a tracking control are performed so that the optical spot traces the tracks. The sector mark indicating the leading end of each track is recorded in a special pit pattern different from another signal. When it is detected by a sector mark detector 6 that the special sector mark pattern has been read out, the processing system is informed of the fact that the optical spot leads the sector and that the signal to be subsequently input is the SYNC A signal, followed by the ID signal. On the other hand, the output 51 from the pre-amplifier 5 also is fed to a phase locked loop circuit 7 (which hereinafter will be referred to as "PLL") so that this circuit 7 generates a read out clock 71 for reading out the ID signal by using the SYNC A signal accompanying the sector mark. Moreover, a timing detector 8 also outputs a signal 81 accurately indicating the timing for starting the ID signal by using the SYNC A signal. As a result, with reference to the read out clock 71 generated by the PLL circuit 7 and the timing pulse 81 generated by the timing detector 8, a decoder 9 reads out the ID signal, i.e., the track address and the sector address.

Figure 3B:
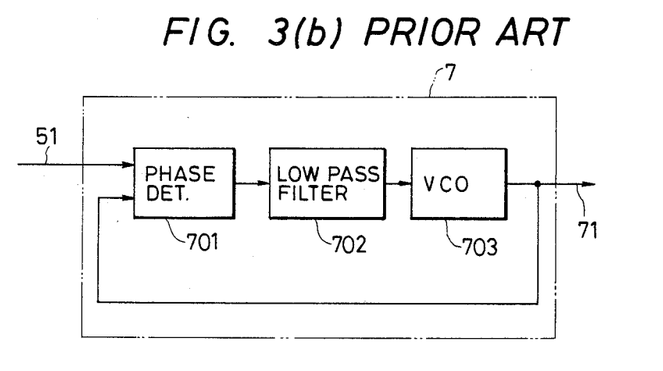

In case the user data is to be written in the data recording area 32 of each sector, the ID information is read out, as above, to identify the target sector, and the data is then recorded in the data recording area of that sector. The information to be written in the data recording area requires not only the user data (DATA) but also a preceding data SYNC B. This SYNC B signal is used like the SYNC A signal of the pre-formatted area to generate the read out clock and timing for reading out the DATA. Incidentally, since the information of the pre-formatted area 31 and the information to be written in the data recording area have different timings in the writing thereof, the pits of information to be written in naturally are out of phase. This makes it necessary to generate the independent synchronization signals as two separate areas on the dish. FIG. 3(b) is a block diagram showing the structure of the PLL circuit 7. This PLL circuit is roughly divided into three parts, i.e., a phase detector 701, a low-pass filter 702, and a voltage controlled oscillator (which hereinafter will be referred to as "VCO") 703 to provide a mechanism for generating the read out clock 71 in phase with the input signal 51. Incidentally, in the read-out of either the ID information or the user data, the PLL circuit is operating to correct the phase of the read out clock by using the ID and DATA signals themselves being read out even after it has had its phase corrected with the synchronization signals SYNC A and SYNC B. As a result, the read out clock does not come out of phase even in the case of an enlarged DATA length so that the correct read-out can be conducted. Incidentally, the function to correct the read out clock by using the signal itself is called "self-clocking".

Figure 4:
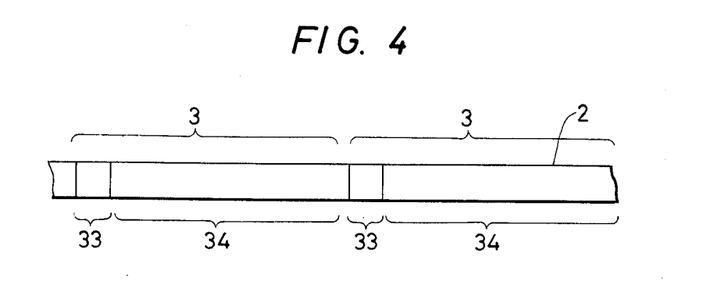
FIG. 4 is a diagram for schematically explaining the sector structure of a sector servo type optical disk.

The description thus far is directed to the signal reproducing method of the pre-groove type of the prior art. FIG. 4 shows sector servo type sectors 3, each of which is divided into a servo field 33 and a data recording area 34. Because of shortage of the pre-groove in the present system, the tracking is conducted by using the tracking information stored intermittently in advance in the servo field 33 of each sector. As a result, the sector number per one track increases to 500 to 1,000, i.e., 10 to 100 times as large as that of the pre-groove type. For example, the pre-groove type shown in FIG. 2 has a sector number of 64 per one track and a one sector length of about 700 bytes, of which a length of about 35 bytes is occupied by the pre-formatted area 31 whereas the synchronization signals SYNC A and SYNC B have a length of about 10 bytes. In the case of the sector servo type of FIG. 4, on the contrary, for example, the sector number is about 1,000, and the sector length is about 45 bytes, of which 2 to 4 bytes are occupied by the servo field. As is apparent from those numerical values, the sector of the sector servo type is far shorter than that of the pre-groove type. Here, if the sector is made to have a structure similar to that of the pre-groove type of FIG. 2, a length of 35 bytes of the one sector length of 45 bytes is required for the synchronization signals and the ID so that the data recording area is remarkably reduced to a value failing to satisfy the practical requirement. Moreover, the length of 35 bytes for the synchronization signals and the ID information is difficult to compress in one sector. It is therefore practically impossible for the optical disk of the sector servo type to incorporate the ID information and the synchronization signals for the phase registration into each of the sectors, thus making it necessary to provide a novel sector format and a novel method for reading out the sector format.

SUMMARY OF THE INVENTION

In view of the background thus far described, an object of the present invention is to provide a sector servo type information recording medium which is recorded with ID information and synchronization signal without remarkably reducing the data recording area, and a method for reproducing the same.

As is different from the pre-groove type of the prior art in which one sector is used as the minimum unit for recording and reproduction, according to the present invention, a plurality of sectors compose together one data unit (which hereinafter will be referred to as a "block"), for which the ID information such as an address and the synchronization signal are recorded. By the format thus adopted, the ratio of the ID information or the synchronization signal to the user data can be dropped to raise the data capacity.

In case the data written in the aforementioned format is to be read out, on the other hand, read out clocks having an identical phase are used among the sectors belonging to a common block. In this case, information of the servo field written in advance is present between any adjacent sectors, but these pieces of servo information have different phase relationships from the data pits because the two have been written at different instants. As a result, if the self-clocking is conducted without differentiating the data pits and the servo information, the read out clocks have their phases disturbed to make the correct clock reproduction and accordingly the correct data reproduction impossible.

According to the present invention, therefore, the clock reproduction by self-clocking is conducted when the optical spot passes over the data recording area. During its passage over the servo field, however, self-clocking is not conducted, but the phase state of the PLL circuit is held to reproduce the data which is recorded in the data recording area of the sequential sectors.

BRIEF DESCRIPTION OF THE DRAWINGS

In the accompanying drawings

DETAILED DESCRIPTION OF PREFERRED EMBODIMENTS

Figure 5A:
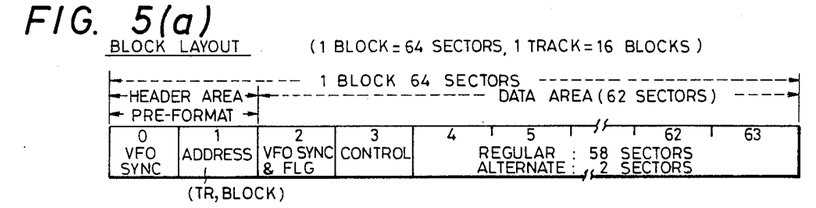
FIGS. 5(a), 5(b), 5(c), 5(d), 5(e) and 5(f) are diagrams for explaining examples of the sectors of the sector servo type optical disk according to the present invention.

The present invention will be described in the following in connection with various embodiments thereof with reference to the accompanying drawings. FIG. 5 is a diagram showing one example of the format of the sector servo type optical disk according to the present invention. FIG. 5(a) is a diagram showing the structure of the block. One block or the minimum unit of the data to be recorded is composed of 64 sectors, and one track is composed of 16 blocks. In other words, one track is composed of 1,024 sectors. One sector has a length of 30 bytes, of which the length of 2 bytes leading each sector provides a servo field (or a sector mark) stored in advance with the servo information when the disk is fabricated. This applies to all of the 1,024 sectors. Of the 64 sectors of each block, the leading 0th and first sectors are used as the header fields which are recorded in advance with the synchronization signal and the ID information not only for the servo field but also for the data recording area after the servo field. The remaining 62 sectors, i.e., the 2nd to 63rd sectors provide data recording areas to be additionally recorded by the user himself.

Figure 5B:
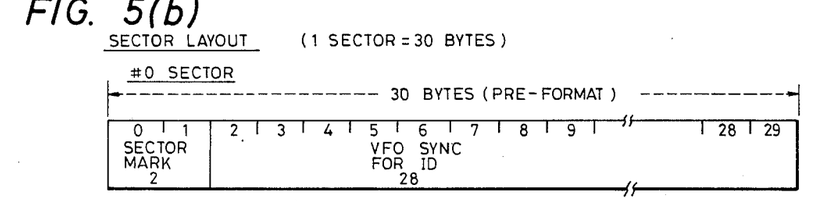
Figure 5C:
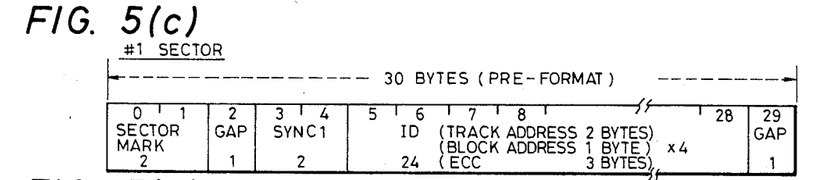
Figure 5D:
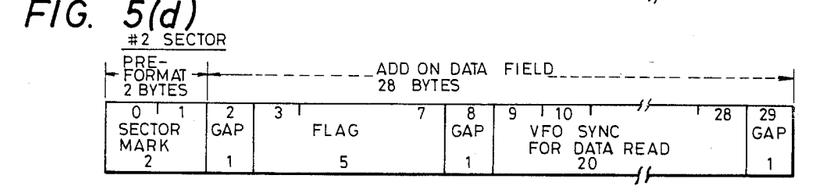
Figure 5E:
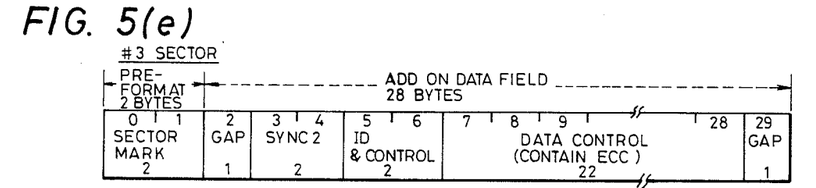

The individual sectors in one block will be described in detail. FIG. 5(b) shows the structure of the 0th sector. This 0th sector is written except at its servo field (for the sector mark) of 2 bytes with synchronization signals (i.e., VFO sync) for the read out clocks in phase with the pit train (which is recorded in the 1st sector) of the addresses (i.e., ID). In other words, the 0th sector is used to control the PLL circuit for the phase registration for reading of the ID information. FIG. 5(c) shows the structure of the 1st sector. This 1st sector is formed with an empty field (or gap) of 1-byte length after the sector mark, followed by a timing signal (i.e., sync 1) field of 2-byte length and further by an ID field for address information. Like the 0th sector, the 1st sector is a pre-formatted area which is written with the information in advance when the disk is fabricated. The data recording area from the 2nd to 63rd sectors is one which is to be written by the user. The data recording area of the 2nd sector of FIG. 5(d) is written with a flag signal (i.e., FLAG) indicating the used state of the block concerned, and a synchronization signal (i.e., VFO sync) for phase registration of the PLL. That VFO sync has absolutely the same function as the VFO sync of the 0th sector, but the VFO sync of the 2nd sector is used as the synchronization signal for generating the read out clock for reading out the data pits to be recorded in the data recording areas of the 3rd to 63rd sectors. The VFO syncs of the 0th and 2nd sectors may have an identical signal pattern. Incidentally, the necessity for the similar signal patterns in the two fields of the common block is evoked by the fact that the read out clocks have to be generated separately at the pits of the preformatted area and the user data because the 0th and 2nd sectors are different in the instants when the information was written so that their recording data (or pits) do not have a continuous phase relationship. The 3rd sector of FIG. 5(e) is one which is used for controlling the data to be written, but is not always functionally indispensable. Incidentally, a timing signal (sync 2) following the sector mark and the gap indicates a timing, at which the information written in that sector is to be read out, and is functionally identical to the signal sync 1 of the first sector. The 4th to 63rd sectors of FIG. 5(f) have absolutely the same formats and are individually recorded with the timing signal (sync 2). The "ID & control" following the timing signal is used for the control of the sectors concerned but is not always necessary. The "ID & control" is followed by the user data in an error correcting code (ECC). In a more strict sense, therefore, the data field can be thought as the data recording areas of the 4th to 63rd sectors whereas the 0th to 3rd sectors can be thought as the header field.

In the present format, when in the data write-in, the read out clock circuit tunes its phase and frequency with the VFO sync of the 0th sector and then confirms whether or not the ID information of the 1st sector is the track and block to be read out. If YES, the information of the 2nd to 63rd sectors is written. Incidentally, the clock to be used for the writing operation may be exemplified by a reference clock in the system, which is different from the read out clock.

When the data is to be read out after it has been recorded, the target track and block are confirmed, as mentioned above, and the read out clock is caused to come into phase with the write data by the VFO sync of the 2nd sector, until the data on and after the 3rd sectors is read out. In other words, the read out clocks are tuned twice at the pre-formatted area and the data field when the data is to be read out.

In the format of the present embodiment, the net data capacity is about 1k bytes for one block, and one track has 16 blocks so that the capacity takes a value of 16k bytes for one track. As has been described hereinbefore, according to a feature of the present invention, the synchronization signal (VFO sync) and the ID information are not written in each sector but are recorded in advance by composing the plural sectors into one block of one data unit so that the data capacity of the sector servo type optical disk is enhanced. Incidentally, how many sectors the one block is composed of is determined according to the specifications of the data processing system but should not be limited to that of the embodiment described above.

Figure 5F:
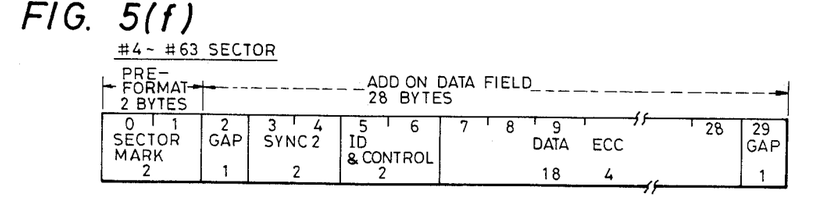
Figure 6A:
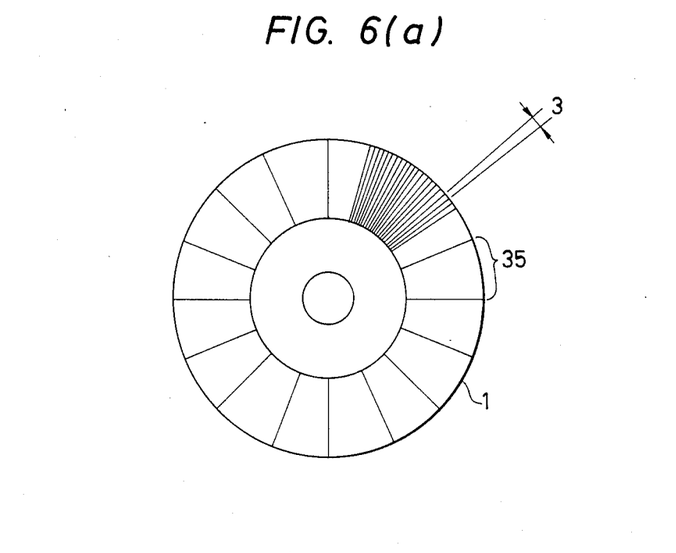
FIGS. 6(a) and 6(b) are diagrams showing the shape of a recording medium of the present invention.
Figure 6B:
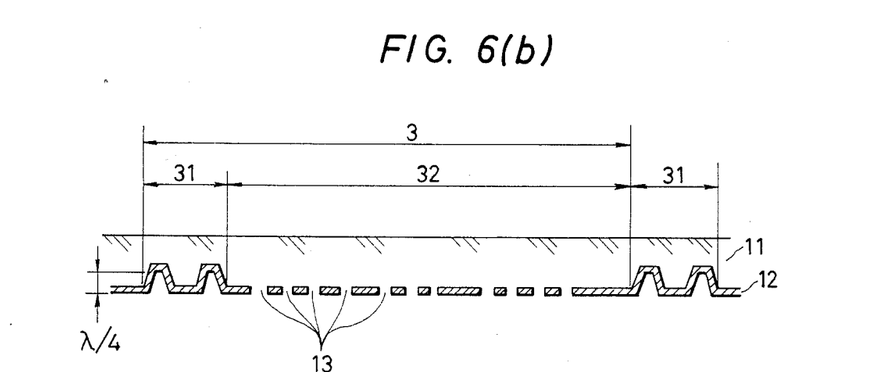

FIG. 6 is a diagram showing one example of the recording medium for recording the format shown in FIG. 5. FIG. 6(a) shows the schematic shape of a disk. One track is divided into 1,024 sectors 3, of which 64 sectors compose a block 35 or one data recording unit. This means that one track is composed of 16 blocks. FIG. 6(b) exaggeratedly show the section of the disk, viewed in the circumferential direction of the track of the sector 3. Denoted at reference numeral 11 is a disk base plate which is made of a transparent material such as polymethylmethacrylate or glass so that the information may be written in the disk surface and may be read out through that base plate 11. This base plate has a thickness of about 1.0 to 1.2 mm. The servo information 31 in the pre-formatted area is formed in advance in the undulations which are one quarter as deep as the wavelength of the laser beam used with the disk. Then, the surface thus undulating is formed thereon with a recording film 12 which is made of such a material as has a suitable refractive index and as has its optical characteristics changed, when it is exposed to an optical beam having a predetermined intensity or more, so that it can record the information. FIG. 6(b) shows an example of a recording film of an ablative type optical disk. Numeral 13 denotes data pits which are formed as a result of the fact that the recording film has been melted by the laser beam. In this example, the pre-formatted area has the phase structure (which has a depth of the quarter wavelength) whereas the data pits have an amplitude structure. However, they should not be limited to these structures but can be exemplified by the amplitude structures, for example. From the standpoint of massproduction of the disk and the S/N ratio of the signals, however, it is considered preferable that the pre-formatted area 31 has phase structure having a depth of ¼ wavelength whereas the data recording area 32 has an amplitude structure. On the other hand, it goes without saying that the recording film should not be limited to the ablative type disclosed in the present embodiment but may be one for either a phase transitional type optical disk or a magneto-optical disk.

Figure 7:
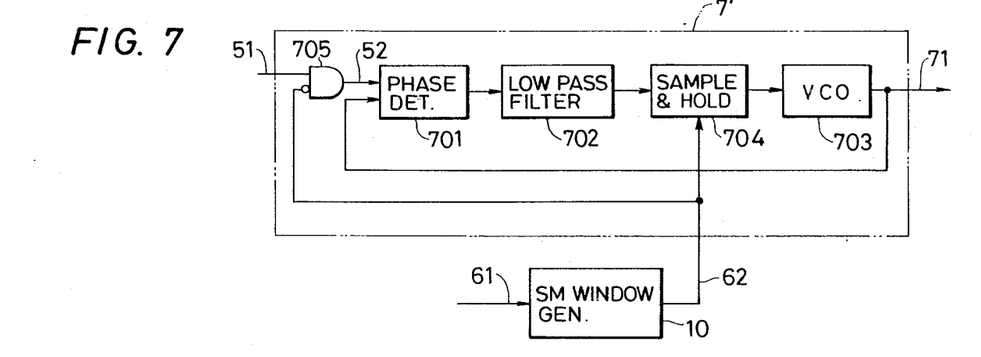
FIG. 7 is a block diagram showing one embodiment of a read out clock generator for explaining the reproducing method of the present invention.
Figure 8:
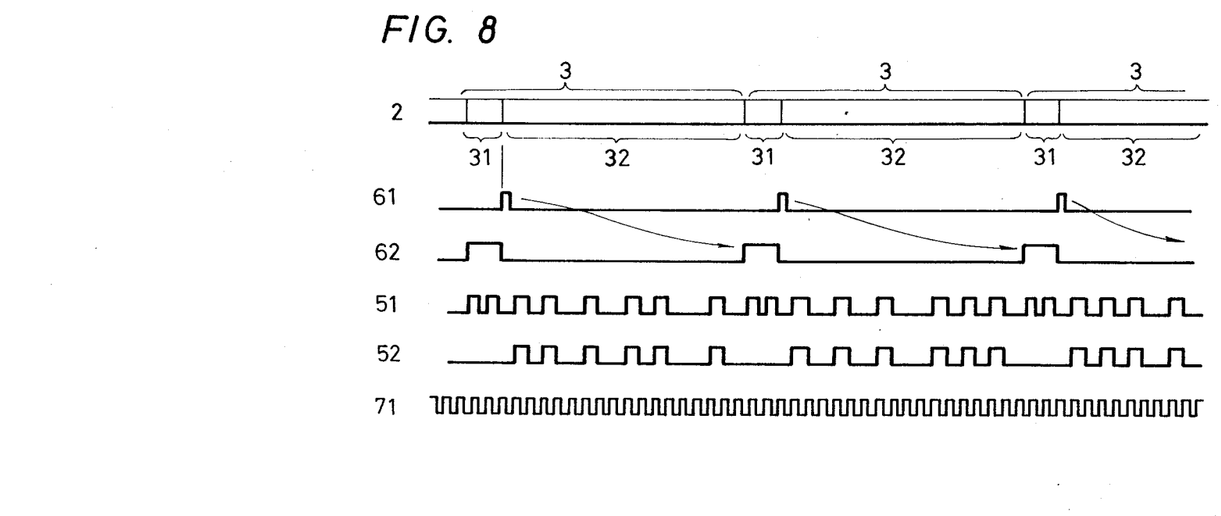
FIG. 8 is a time chart for explaining the operations of the circuit of FIG. 7.

Next, the reproducing method of the present invention will be described in the following. FIG. 7 is a block diagram showing one example of a read out clock generator for carrying out the reproducing method of the present invention. This read out clock generator is structurally featured over the pregroove type of FIGS. 3(a) and 3(b) in that a sampling and holding circuit 704 is interposed between the low-pass filter 702 and the VCO 703. The signal 62 for holding the sampling and holding circuit and for controlling a gate circuit 705 is generated from the output 61 of the sector mark detector 6 by a sector mark window generator 10. The operations of the circuit of FIG. 7 will be described with reference to the time chart of FIG. 8. The highest chart 2 of FIG. 8 depicts the track shape on the optical disk, and the lower time charts 61, 62, 51, 52 and 71 depict the waveforms of the signals which are generated by the respective circuits when the optical spot passes over the track 2. Therefore, the abscissa in FIG. 8 indicates the time axis. The signal 51 input to a PLL circuit 7' is prepared by digitizing the signal read out from the optical disk, and this digitization is conducted by the method of edge or peak detection in accordance with the recording mode of the signals in the disk. At the same time, the signal 51 is applied to the sector mark detector 6, the timing detector 8 and the decoder 9. The sector mark detector generates a pulse as the output 61 when it detects the pattern of the sector mark from the signal 51. In the case of the present embodiment, the servo field 31 is written in advance with the sector mark, by which a tracking signal is generated. Here, since the time periods of the servo field and the data recording area are predetermined, the servo field of a subsequent sector can be predicted if the sector mark of a certain sector is detected. In response to the signal 61 as the input, therefore, the sector mark window signal 62 indicating the position of the servo field of the subsequent sector is generated by the sector mark window generator 10. In response to that signal 62, the signal 52 is obtained from a gate circuit 705 by eliminating the pre-formatted sector mark area from the signal 51. The signal 52 thus obtained is an extraction of the user data signal only and is the information which is written in an identical clock by a clock having a continuous phase. Therefore, the reproduction of the read clock in the PLL cirtuit is conducted by using the signal 52. If the remaining signal 51 containing the signal of the servo field is input to the phase detector 701, the phase comparison is conducted by mixing two kinds of signals of different phases so that the signal in the servo field produces noises to disturb the clock generation.

The output of the phase detector 701 has its high-frequency component filtered out by the low-pass filter 702 before it is input to the sampling and holding circuit 704. In response to the sector mark window signal 62, the sampling and holding circuit holds the voltage to be input to the VCO 703 during the time period of the servo field. The voltage is converted into a frequency to generate the read out clock 71 by the VCO, and this read out clock 71 is fed back to the phase detoctor 701 until it is compared with the aforementioned signal 52. As has been described above, the feedback loop is established so that the read out clock 71 in phase with the read out signal can be generated as the output.

Next, the meaning of the sampling and holding circuit 704 will be described in detail in the following. The signal waveforms 51, 52 and 71 depicted in FIG. 8 have a small number of, e.g., several pulses, as written in the data recording area of one sector, but contain pulses of ten times or more as a matter of fact. As has been described hereinbefore, moreover, the phase comparison is conducted upon reception of each data pulse by self-clocking to correct the phase of the output read out clock at all times. In the sector servo type optical disk, however, there disappears from the servo field any signal to be compared, as denoted by the signal 52. The length 31 of the servo field is about 10% as long as one sector and corresponds to the length for about ten comparisons. In case the sampling and holding circuit 704 is not used, the output of the low-pass filter 702 will be caused to fluctuate depending upon the time constant of the filter before the phase comparison so that the phase of the output or the read out clock 71 will also fluctuate. This makes it impossible to read out the information of the adjoining sector. In order to eliminate the defect described above, according to the present invention, the voltage to be input to the VCO 703 is held for the time period corresponding to the servo field, for which the phase comparison is not conducted, by inserting the sampling and holding circuit to the upstream stage of the VCO 703. These sampling and holding operations make it possible to remarkably reduce the fluctuations of the read out clock during the time period for which the optical spot is passing over the servo field. As a result, the information written in the data recording areas of the adjoining sectors can be read out continuously without any pulling operation of the PLL circuit for each sector.

Incidentally, the detail of the description will be supplemented although it has been more or less omitted for clarity. As has been shown in FIGS. 5(c), 5(d), 5(e) and 5(f), there are occasionally formed before and after the sector marks gaps in which no information is recorded. As a result, there exists in those fields no signal to be subjected to the phase comparison, and the sector marks and the gaps are joined together (to have a length of 4 bytes in the example of FIG. 5) and deemed as the servo field, in which the input voltage to the VCO is held. As shown in FIGS. 5(e) and 5(f), moreover, the timing signal sync 2 is written prior to the user data in the head of the data recording area of each sector but has been omitted in FIG. 8 because it is not essential. On the other hand, that timing signal and the following ID & control signal are not indispensable and can be omitted.

As has been described hereinbefore, according to the present invention, the sector servo type optical disk can drastically enhance the recording capacity because the sequential sectors can be reproduced by the read out clocks having the sequential pieces of phase information.

Incidentally, the foregoing description is directed to the example of the analog type PLL using the VCO, but the present invention can also be realized using a digital type PLL that uses no VCO such as the start-stop synchronization. In this modification, too, the read out clock may be reproduced and corrected by self-clocking in accordance with the information of the data recording area, and the phase information of the read out clock may be held in the servo field without any phase comparison.

What is claimed is:

1. An information recording medium which is divided into a multiplicity of sectors and has a plurality of tracks on which information and data may be recorded, characterized in that each track is divided into a plurality of blocks, each block representing a data unit and being made up of a predetermined number of sequential sectors, each sector having a leading part in which a sector mark is pre-recorded and a remaining part forming a data recording area in which data is recorded, an initial part of each block comprising a plurality of pre-recorded sectors including one sector in which thereis recorded in the data recording area thereof a first synchronizing signal for controlling the generation of first clock pulses for reading block identification information for identifying the block and another sector in which said block identification information is recorded in the data recordign area thereof, and a remaining part of each block having a first sector in which there is recorded in the data recordign area thereof a second synchronizing signal for controlling the generation of second clock pulses for reading of recorded data and a plurality of remaining sectors having said recorded data and a plurality of remaining sectors having said recorded data recorded in the data recording area thereof.

2. A method for reproducing data from an information recording medium which is divided into a multiplicity of sectors and has a plurality of tracks on which information and data may be recorded, characterized in that each track is divided into a plurality of blocks, each block representing a data unit and being made up of a predetermined number of sequential sectors, each sector having a leading part in which a sector mark is pre-recorded and a remaining part forming a data recording area in which data is recorded, an initial part of each block comprising a plurality of p re-recorded sectors including one sector in which there is recorded in the data recording area thereof a first synchronizing signal for controlling the generation of first clock pulses for reading block identification information for identifying the block and another sector in which said block identification information is recorded in the data recording area thereof, and a remaining part of each block having a first sector in which there is recorded in the data recording area thereof a second synchronizing signal for controlling the generation of second clock pulses for reading of recorded data and a plurality of remaining sectors having said recorded data recorded in the data recording area thereof, said method comprising the steps of:

reading the sector mark recorded in the leading part of each sector and generating a sector mark signal thereform;

reading out said second synchronizing signal from said first sector;

generating said second clock pulses in synchronization with said second synchronizing signal using a phase locked loop;

deleting said sector mark signals from a signal reproduced from said tracks; and holding the state of said phase locked loop in synchronism with said reproduced signal from which said sector mark signals have been deleted, so that said phase locked loop is not synchronized with said sector mark signals.

* * * * *